A. A. QUICK.
TOOTHED TRANSMISSION GEARING.
APPLICATION FILED MAR. 22, 1915. RENEWED MAR. 28, 1917.
1,225,856.
Patented May 15, 1917.
2 SHEETS—SHEET 1.
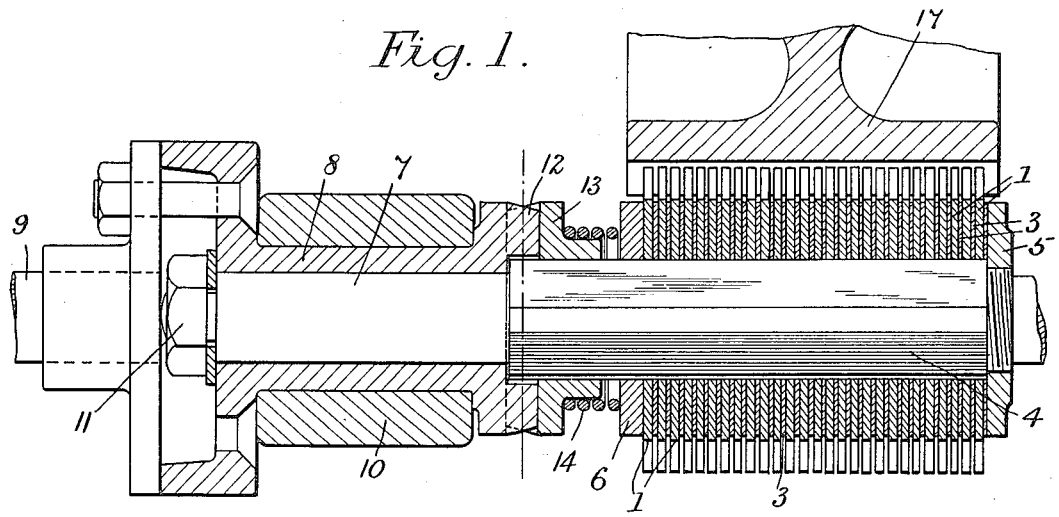
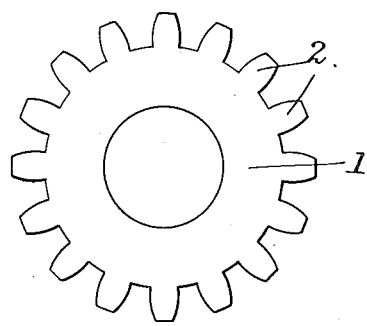
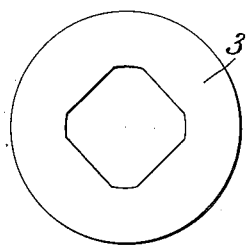
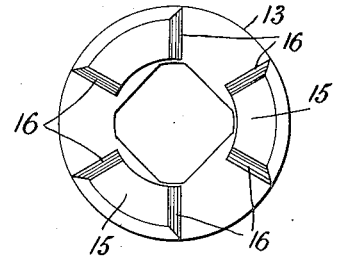
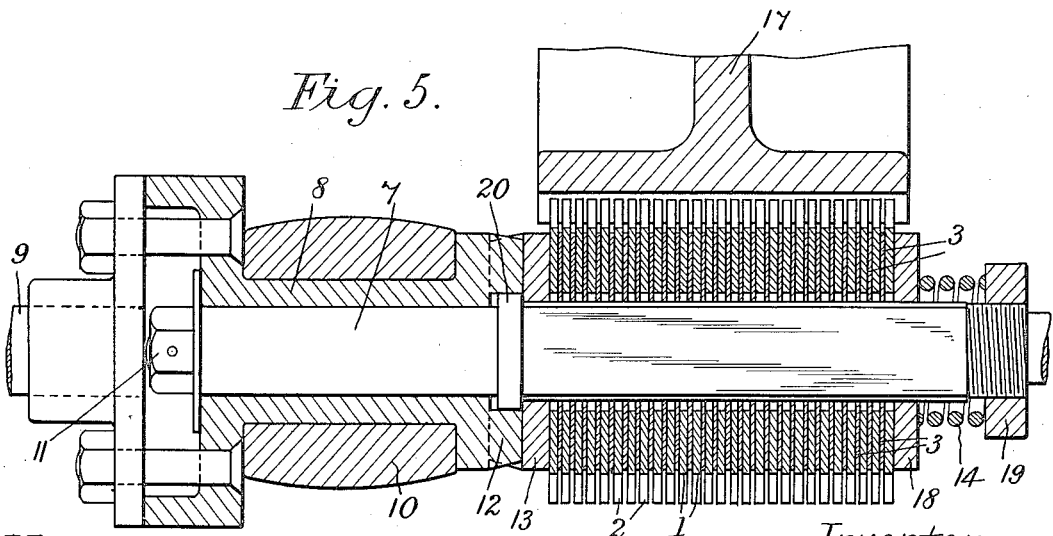
Witnesses.
Inventor.
Alfred A. Quick
by Foster Freeman Watson &c. Attys

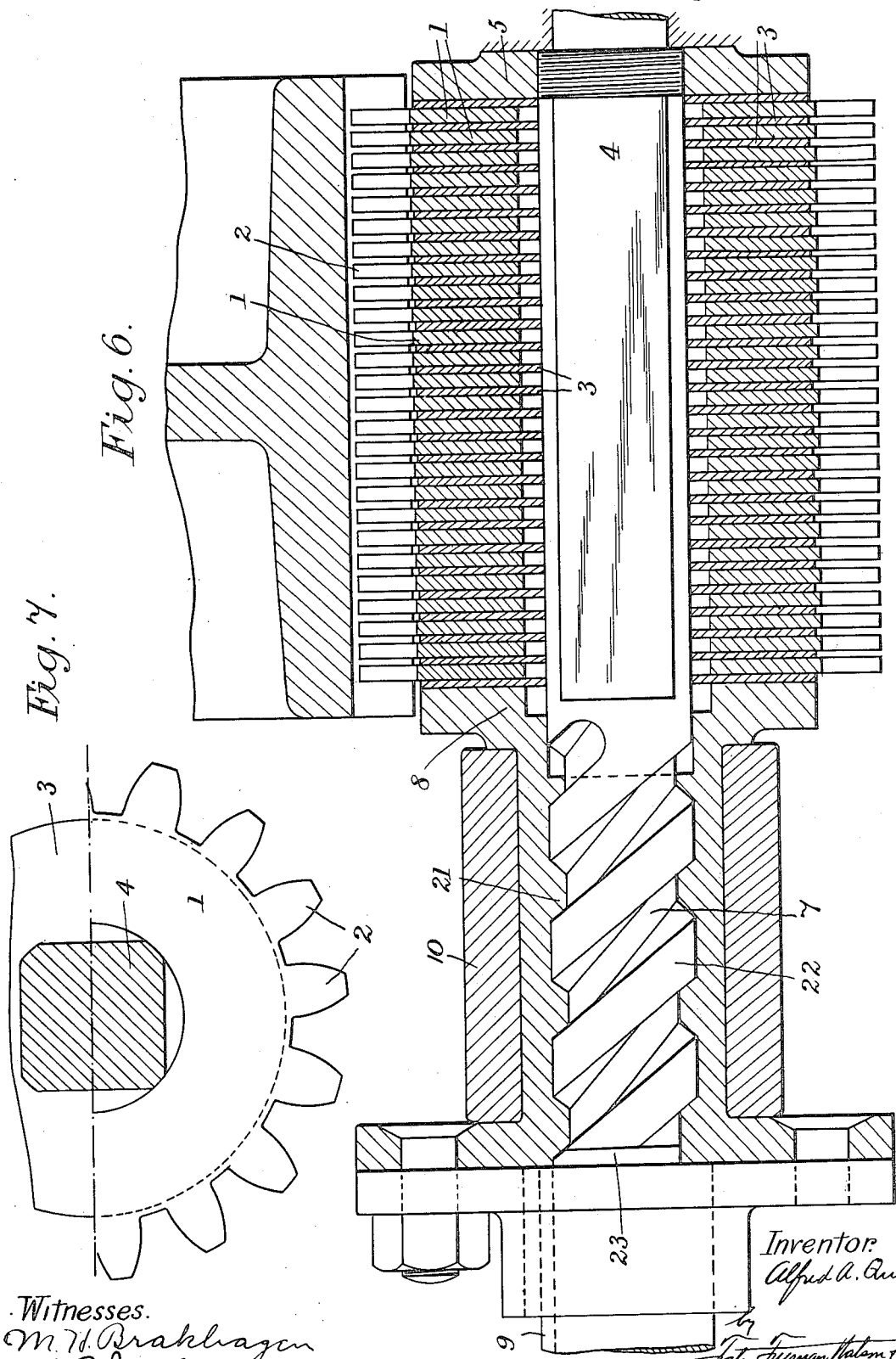

UNITED STATES PATENT OFFICE.

ALFRED ARTHUR QUICK, OF LONDON, ENGLAND.

TOOTHED TRANSMISSION-GEARING.

1,225,856.　　　　　　Specification of Letters Patent.　　Patented May 15, 1917.

Application filed March 22, 1915, Serial No. 16,094. Renewed March 28, 1917. Serial No. 158,111.

*To all whom it may concern:*

Be it known that I, ALFRED ARTHUR QUICK, a subject of His Majesty the King of Great Britain, and a resident of London, England, have invented a certain new and useful Improvement in Toothed Transmission-Gearing, of which the following is a specification.

This invention relates to improvements in toothed transmission gearing and while the invention will be described with particular reference to straight tooth spur gear wheels and worm wheels, it will be understood that the invention is equally applicable to other types of toothed gearing, such as, toothed racks, quadrants, bevel wheels single or double helical toothed wheels, or other devices having teeth forming a part or parts of gearing for the transmission of power.

It is well known that the efficiency, durability and strength of toothed gearing are considerably reduced by inaccuracies due to imperfect machining and more especially to distortions due to hardening, contraction and expansion and also to inaccuracies which develop by uneven wear and deviation from alinement of the shaft and the wheels, and other causes.

The object of the present invention is to provide means whereby the load is at all times distributed evenly over the whole line of contact of the intermeshing teeth, notwithstanding any unevenness that may exist in such teeth, thereby preventing any overloading at any particular point in the length of the tooth. Means are also provided to permit the teeth to gradually take up the load without shock, and, in the case of sudden overloading, stripping and breakage is prevented by allowing the wheel itself to alter its position on the shaft against frictional or other resistance. By reason of the adaptability of the wheel it is possible to make same of greater width than has heretofore been possible.

According to this invention it is proposed to form the toothed wheel, rack or other toothed element, of a plurality of disks or plates having teeth formed thereon, each of such plates having a rotary and longitudinal movement in the case of a wheel, or a transverse and longitudinal movement in the case of a rack, against frictional or other resistance to enable them to adapt themselves to the teeth with which they have to mesh.

In constructing toothed elements in accordance with this invention it is proposed to interpose a friction disk or plate between each toothed disk or plate and to provide means for holding the disks or plates thus arranged in assembled relation and for varying the degree of friction between the several disks or plates as the load increases or decreases.

The longitudinal movement of the disks or plates on the shaft for the purpose of imparting pressure to the disks of which the wheel is composed, and thereby control the rotative movement imparted thereto by the load which is applied, may be effected in various ways, to provide the necessary amount of friction to carry the load whether constant or varying, such as for example by springs or by means of the torque on the shaft produced by the resistance due to the load, or by means of a series of inclined planes and recesses or notches furnished on a part of the driving element adapted to co-act with corresponding inclined planes and recesses furnished on a sleeve or part slidably mounted on the shaft, the slidable sleeve being arranged to bear against the combined disks or plates, preferably through the medium of a spring, or the inclined planes and recesses may be formed on a part of the driving element and on the pinion shaft itself.

The several parts of the gearing are so arranged that when the axial movement is imparted to the disks, whether by springs, torque or otherwise, the end pressure on the bearings is not increased but is decreased by reason of the fact that the disks are drawn toward each other and away from the bearings, and should any sudden shock be thrown on the gear, in constructions where a spring is interposed between the driving pinion and the driving shaft, the tendency will be for the spring to produce a cushioning effect and thus prevent the shock being transmitted to the driving shaft.

If desired an adjustable spring or manually actuated clutch may be arranged between the driving shaft and the means for exerting endwise pressure on the disks so that the initial pressure between the disks may be adjusted as desired.

In the accompanying drawings which illustrate some examples of this invention:—

Figure 1 is a longitudinal section showing the invention applied to a straight toothed spur gear.

Figs. 2, 3 and 4, are side views of three parts of the mechanism shown in Fig. 1, shown separately.

Fig. 5 is a longitudinal section of a modified arrangement of parts, and

Figs. 6 and 7 are longitudinal elevation and side elevation respectively of a further modification.

In the example of construction shown in Figs. 1 and 2, the driving pinion is composed of a plurality of laminæ comprising disks or plates 1 furnished on their peripheral edges with teeth 2 of the required pitch, and friction disks or plates 3 arranged alternatively with the disks 1, the combined disks being mounted on a shaft 4 between plates or abutments 5 and 6 for maintaining the disks 1 and 3 in assembled relation, means being provided for imparting a certain amount of longitudinal pressure at the ends.

The shaft 4 is for a portion of its length formed square, the sharp corners being removed and the corners formed as portions of a circle. The disks 1 are provided with a circular central aperture and are free to rotate on the circular portions of the shaft 4 whereas for the purpose of enabling the disks 3 to perform their function as friction disks they are secured to the shaft so as to rotate therewith, but not apart from same. To this end they are provided with a central aperture of the same shape as the shaft, as shown in Fig. 4. Both disks 1 and 3 are free to move longitudinally on the shaft 4.

The plate or abutment 5 is screwed or otherwise fixed on the shaft 4 and the plate or abutment 6 is slidably mounted on the squared portion and maintained in contact with the disks or plates in the manner hereafter described. The shaft 4 is provided with an extension 7 formed round in cross section, said part being rotatably mounted in a sleeve 8, which sleeve is bolted to or connected with the driving shaft 9 and is rotatably mounted in a bearing 10.

As will be seen from Fig. 1, the shaft 4 has no axial or endwise movement, but is rotatively held in the sleeve 8 by the nut 11 which draws the shoulder formed by the square part 4 against the end of the sleeve 8.

In order that the laminæ of which the driving pinion is composed may be pressed against each other as the driving shaft is rotated, the sleeve 8 is furnished with what may be termed a clutch element 12, the co-acting part 13, of such clutch element being slidably mounted on the shaft 4. The clutch element 13 does not bear or act directly on the laminæ but indirectly through the medium of a coiled spring 14 placed between the element 13 and plate 6.

The clutch elements 12 and 13 are furnished on their co-acting faces with projections 15, the projections on one face engaging with the recesses on the other face, the radial faces 16 of such projections being inclined as shown in Fig. 2 so that they act in either direction of rotation.

In operation, when the driving shaft 9 is set in motion the shaft 4 will not at first rotate with said shaft due to the slipping connection between the shaft 4 and the sleeve 8 and the resistance of the driven wheel 17, due to the load, which tends to cause the toothed disks to remain at rest.

As the torque on the shaft increases, the clutch element 13 will, by reason of the projections thereon sliding up the inclined planes on the clutch element 12, be moved toward the plate 6 thereby forcing the disks 1 and 3 into closer contact, and against the plate 5 thereby increasing the friction between such disks and allowing the pinion to gradually pick up the load. As the load and thereby the torque on the shaft 4 decreases the clutch element 13 will be returned by the spring 14 into its normal position.

The pressure of the spring 14 may be increased by placing a further non-rotatable plate or plates on the shaft 4 between the last friction disk 3 and the plate 5 or at the other end between the last disk 1 and plate 6.

For the purpose of providing means for readily adjusting the pressure of the spring 14 the parts may be arranged as shown in the example of construction illustrated in Fig. 5, in which the spring 14 is located between the plate 18 and nut 19, and the clutch element 13 bears directly against the last disk at the other end of the pinion.

In order to prevent the pressure of the spring forcing the clutch elements 12 and 13 together a collar 20 is formed on the shaft 4, such collar being drawn against the element 13 by the tension of the spring.

It will be evident that the means for effecting a variation in the frictional pressure between the disks 1 and 3 by means of inclined planes may be carried out in other ways than that above described for example, the inclined planes and recesses may actually take the form of an ordinary screw thread, or helical groove, as illustrated in the example of construction shown in Figs. 6 and 7 according to which the end of the sleeve 8 is caused to bear directly against the end of the laminated pinion. The interior surface of the sleeve 8 is provided with a spirally arranged projection 21 and forms the clutch element equivalent to the element 12, Fig. 1. The extension 7 of the shaft 4 is, in this construction, provided with a spirally arranged projection 22 forming the co-acting clutch element equivalent to the element 13, Fig. 1. As will be seen in Fig. 6, a small space 23 is left between the end of the part 7 and the end of the driving shaft 9 so that when the latter is rotating the resistance due to the load causes an endwise movement of the shaft 4. Therefore as the sleeve 8 cannot move axially in the bearing 10 the plate 5 is drawn toward the part 8 and thereby increases the frictional pressure between the several disks of the pinion, said pressure increasing as the torque on the shaft 4, and consequently as the load, increases.

It will be seen that longitudinal movement of the disks on the shaft 4 results in an increase of the friction between such disks, such friction not however being great enough to prevent each toothed disk automatically accommodating itself to any unevenness of the tooth with which it is in mesh. By this means each toothed disk which comprises a section of the length of the whole pinion, is adapted to carry the proper proportion of the load. It therefore follows that the entire series of toothed disks must be in contact with the teeth on the driven wheel, the teeth always assuming a position to meet the inaccuracies as they develop thereby retaining the efficiency of the whole gearing. Should any over-loading be imposed on any section, or on the entire length, of the pinion, the toothed disks are enabled to move around the shaft 4 thereby preventing stripping or breakage of the teeth.

It will be evident that in straight tooth gears the simple pressure on the teeth due to the load will only tend to impart a rotary motion to the toothed disks; that is, there will not be any tendency for the disks to move axially and produce end pressure without some extraneous means such as those before described for applying same.

The cutting of the teeth of the laminated wheel may be effected in one way by rigidly securing together a number of disks adapted to form both toothed and friction disks, all being in the first case of the same diameter, the teeth would then be cut on the periphery in the ordinary manner, such as by hobbing cutters. When finished the disks would be separated and the second and every other disk be removed and either replaced by further friction disks or the teeth on the disks removed could be cut off so that such disks could be used as the friction disks.

The teeth of each disk, whether for use with straight or angularly arranged teeth, may be rounded at their edges to prevent wear upon the otherwise sharp angles which would be left, and also to prevent the edges of the tooth from becoming flattened by the continuous rolling action of the co-acting wheel.

What I claim is:—

1. A toothed gear element for use in toothed gearing, composed of a series of toothed disks, a series of friction disks alternately arranged with the disks of the first named series, a carrying member for both series of disks, the toothed disks being mounted on said carrying member so as normally to rotate therewith but so as to be capable, under certain conditions, of an axial movement on said carrying member and of a rotary movement in a reverse direction to the rotary movement of the carrying member, the friction disks being mounted so as to rotate with said carrying member but so as to be capable, under certain conditions, of an axial movement on said carrying member, means for drawing the two series of disks together thereby setting up frictional resistance between such disks, and means for increasing such resistance as the load increases whereby the disks are caused to rotate with the carrying member as the load increases.

2. A toothed gear element for use in toothed gearing, composed of a series of toothed disks, a series of friction disks alternately arranged with the disks of the first named series, a carrying member for both series of disks, the toothed disks being mounted on said carrying member so as normally to rotate therewith but so as to be capable, under certain conditions, of an axial movement thereon and of a rotary movement in a reverse direction to the rotary movement of the carrying member, the friction disks being mounted so as to rotate with said carrying member but so as to be capable as the load increases of an axial movement thereon, means for holding the two series of disks in assembled relation, means co-acting with the last named means for drawing the two series of disks together thereby setting up frictional resistance between such disks whereby they are normally caused to rotate with the carrying member, and means for varying the degree of friction between said disks.

3. A toothed gear element for use in toothed gearing composed of a series of toothed disks, a carrying member for said disks, the disks being mounted on said carrying member so as normally to rotate therewith but so as to be capable, under certain conditions, of an axial movement thereon and of a rotary movement in a reverse direction to the rotary movement of the carrying member, a series of friction disks alternately arranged with the disks of the first named series, said friction disks being mounted so as to rotate with said carrying member but so as to be capable, under certain conditions, of an axial movement thereon, means for holding the two series of disks in assembled relation comprising a part fixed to the carrying member, a part slidably arranged on said carrying member, means for pressing said slidable part against the side of the disks and the disks against the fixed part on the carrying member, and means for increasing the frictional resistance between such plates whereby they are normally caused to rotate with the carrying member.

4. In toothed gearing a toothed gear element composed of a plurality of disks, a carrying member upon which such disks are frictionally mounted, said disks being mounted on the carrying member so as normally to rotate therewith but so as to be free to adjust themselves to any inaccuracies in the teeth of a co-acting toothed element so that the load is distributed along the entire length of the intermeshing teeth, and means for increasing the resistance as the load increases comprising clutch elements located between the driving element and the disks such elements having inclined co-acting faces whereby the torque on the shaft effects a separation of such clutch elements and a consequent increase of friction between the disks.

5. In toothed gearing, a toothed element composed of a series of toothed laminæ and a series of co-acting friction laminæ, a shaft upon which such laminæ are mounted, the laminæ of the first named series being mounted so as to be free to rotate in either direction on said shaft and to slide axially thereon, the laminæ of the second named series being mounted so as to have no independent rotary movement apart from said shaft but being free to slide axially thereon, means on said shaft for holding the two series of laminæ in assembled relation, means for setting up frictional resistance between such laminæ and means for increasing such resistance as the load increases.

6. In toothed gearing, a toothed element composed of a series of toothed disks, a series of friction disks alternately arranged with the disks of the first named series, a shaft upon which said disks are mounted, the disks of the first named series being mounted so as to be free to rotate in either direction on said shaft and to slide axially thereon the disks of the second named series being mounted so as to have no independent rotary movement apart from said shaft but are free to slide axially thereon, a spring located between said shaft and disks whereby the disks are normally held together by a yielding pressure, and means located between the shaft and the disks for increasing the frictional pressure as the load and thereby the torque on the shaft, increases.

7. In toothed gearing, a toothed gear element composed of a plurality of disks, a carrying member upon which such disks are frictionally mounted, said disks being mounted on the carrying member so as normally to rotate therewith but so as to be free to adjust themselves to any inaccuracies in the teeth of a co-acting toothed element so that the load is at all times evenly distributed along the entire length of the intermeshing teeth, means for maintaining the disks in assembled relation with a degree of friction, and means for causing the disks to move axially as the load increases whereby the friction between said disks is increased.

8. In toothed gearing a toothed gear element composed of a plurality of disks, a carrying member upon which such disks are frictionally mounted, bearings for supporting said carrying member, said disks being mounted on the carrying member so as normally to rotate therewith but so as to be free to adjust themselves to the load and to any inaccuracies in the teeth of a co-acting toothed element so that the load is distributed along the entire length of the intermeshing teeth, and means for drawing the disks toward each other and away from the bearings supporting the carrying member whereby the friction between the disks is increased and the gear element is able to gradually pick up the load as such load increases.

In testimony whereof I have hereunto set my hand in the presence of two subscribing witnesses.

ALFRED ARTHUR QUICK.

Witnesses:
    ALLEN PARRY JONES,
    A. KNIGHT CROAD.